(12) United States Patent
Hindemith

(10) Patent No.: US 6,352,148 B1
(45) Date of Patent: Mar. 5, 2002

(54) DEVICE FOR THE ALIGNMENT OF TUBE SEGMENTS

(75) Inventor: Reinhold Hindemith, Ottersweier (DE)

(73) Assignee: icoma FBS GmbH Packtechnik, Achern (DE)

( * ) Notice: Subject to any disclaimer, the term of this patent is extended or adjusted under 35 U.S.C. 154(b) by 0 days.

(21) Appl. No.: 09/441,446

(22) Filed: Nov. 17, 1999

(30) Foreign Application Priority Data

Nov. 18, 1998 (DE) .......................................... 198 53 026

(51) Int. Cl.⁷ .............................................. B65G 47/24
(52) U.S. Cl. ...................................................... 198/415
(58) Field of Search ................................ 198/412, 413, 198/415, 456, 547, 460.1, 459.8

(56) References Cited

U.S. PATENT DOCUMENTS

| | | | | |
|---|---|---|---|---|
| 3,690,434 A | * | 9/1972 | Anfossi ....................... | 198/415 |
| 4,901,842 A | * | 2/1990 | Lemboke et al. ............ | 198/415 |
| 5,341,915 A | | 8/1994 | Codia et al. ............. | 198/460.1 |
| 5,857,672 A | * | 1/1999 | Fowler et al. .......... | 198/415 X |

FOREIGN PATENT DOCUMENTS

| | | |
|---|---|---|
| DE | 3842964 A1 | 11/1989 |
| DE | 3918036 C2 | 1/1993 |
| DE | 42 22 972 | 11/1995 |
| DE | 4415047 A1 | 11/1995 |
| JP | 62-83920 A | 4/1987 |

\* cited by examiner

*Primary Examiner*—James R. Bidwell
(74) *Attorney, Agent, or Firm*—Connolly Bove Lodge & Hutz LLP

(57) ABSTRACT

Device for the alignment of tube segments, especially with several stagger-cut layers of paper at the ends, exhibiting mutually parallel first conveyor belts on which the tube segments lie with their wide sides facing the direction of travel, as well as second conveyor belts carrying stops arranged at preset intervals, wherein conveyor belts are aligned at an angle relative to the direction of travel. The first conveyor belts are aligned in the direction of travel and the second conveyor belts at an angle relative to the direction of travel. The stops on the second conveyor belt are entrainment devices designed to engage the back wide side of the tube segments, their purpose being to push an end of the tube segment on the first conveyor belt up to a sensor that operates without making contact. A signal from the sensor triggered by the end retards the second conveyor belts, which is leading first conveyor belts, in such a way that further transport will be taken over exclusively by the first conveyor belts.

20 Claims, 2 Drawing Sheets

DEVICE FOR THE ALIGNMENT OF TUBE SEGMENTS

BACKGROUND OF THE INVENTION

The invention concerns a device for the alignment of tube segments

In the case of a known device of this type, the individual tube segments are laid on first conveyor belts that run mutually parallel. Running in addition to the first conveyor belts are second conveyor belts, equipped with stops and configured as cog belts. The second conveyor belts run at a slower speed than the first conveyor belts. Due to the difference in speed, the tube segments are moved until they come to lie against the stops of the second conveyor belts and are held in this contact position. Viewed in the direction of projection relative to the plane of conveyance, all conveyor belts extend at an angle relative to the direction of travel. The result of this is that the tube segments are pushed crosswise relative to the direction of travel up to their position on a limiting belt running laterally relative to the conveyor belts. To enable this position to be.

The known solution is suitable only for tube segments that are made sufficiently strong and rigid at their extremities. In the case of tube segments made from a few thin-walled or soft layers, a proper alignment is not possible using the known device, because they cannot withstand the pressure at the limiting belt and buckle. This danger is present in particular in the case of tube segments whose ends exhibit an angled cut. For such obliquely cut tube segments, the pressing forces must be absorbed by only one layer, independently of the number of remaining layers, namely, the furthest projecting outer layer.

A process and a device for conveying sheet layers from a collecting station of a machine for manufacturing flat material are furthermore already known from, for example DE 4,415,047 A1. This device serves to separate the stacked sheets arriving from a collecting station that have already been aligned as a stack. The known device does not encounter the problem of the alignment of tube segments, as occurs during the manufacture of sacks and bags. Other known publications which concern the conveyance and transport of individual elements likewise have no significant relevance to the problem addressed by the present invention: A device for the separation of tablets is known from DE 4,222,972 C2. A further known publication, DE 3,918,036 C2 discloses a device for grouping elongated parts transported in crosswise position, especially sectional bar stock. It does not anticipate aligned conveyance of already separated transport goods with little shape stability.

Moreover, a further publication DE 3,842,964 A1, discloses the formation of groups of articles, particularly for automatic packaging lines, which work with grippers.

U.S. Pat. No. 5,341,915 describes a conveyor system for a precise transport of articles such as food containers and includes a series of conveyor belts which all run in the direction of travel or parallel to one another.

Finally, yet another device is known (JP 6,283,920 A) which serves for the alignment and transport of fruit or the like. This publication discloses the inclined arrangement of conveyor belts or conveyor-belt zones. This known solution is unusable for the object of the present invention.

SUMMARY OF THE INVENTION

Starting from the state of the art described in the preamble to patent claim 1, the underlying object of the invention is to create a device of the type assumed to be known in such a way that it is also designed for the proper alignment of tube segments which do not exhibit flexural stiffness in all areas.

In the case of the design according to the present invention, transport takes place both in the direction of travel as well as for lateral alignment by means of entrainment means that grip the back wide side of the tube segments. The wide sides of the of the tube segments are in each case made sufficiently stiff in order to ensure orderly transport, both in the direction of travel as well as the crosswise direction. The entrainment means engaging the back wide side push the tube segments on the depository plane formed by the lower conveyor belts. The ends, which are sensitive to mechanical stress, of which only one is utilized for lateral alignment, are not subjected to any mechanical stress whatsoever in the case of invention. Rather, their position is scanned without making contact, and if the alignment position marked by the sensors is achieved, the reduction of the present the revolution rate of the conveyor belts carrying the entrainment means causes further transport in the aligned position to be assumed by conveyor belts then leading in the direction of travel. After correct alignment has taken place, the aligned tube segments are transferred to a further conveyor belt, with which it is assured that the alignment will no longer change.

A preferred embodiment(s) of the invention is/are described in detail below with the aid of the drawings. In the drawings:

DETAILED DESCRIPTION OF PREFERRED EMBODIMENTS

Figure 1:
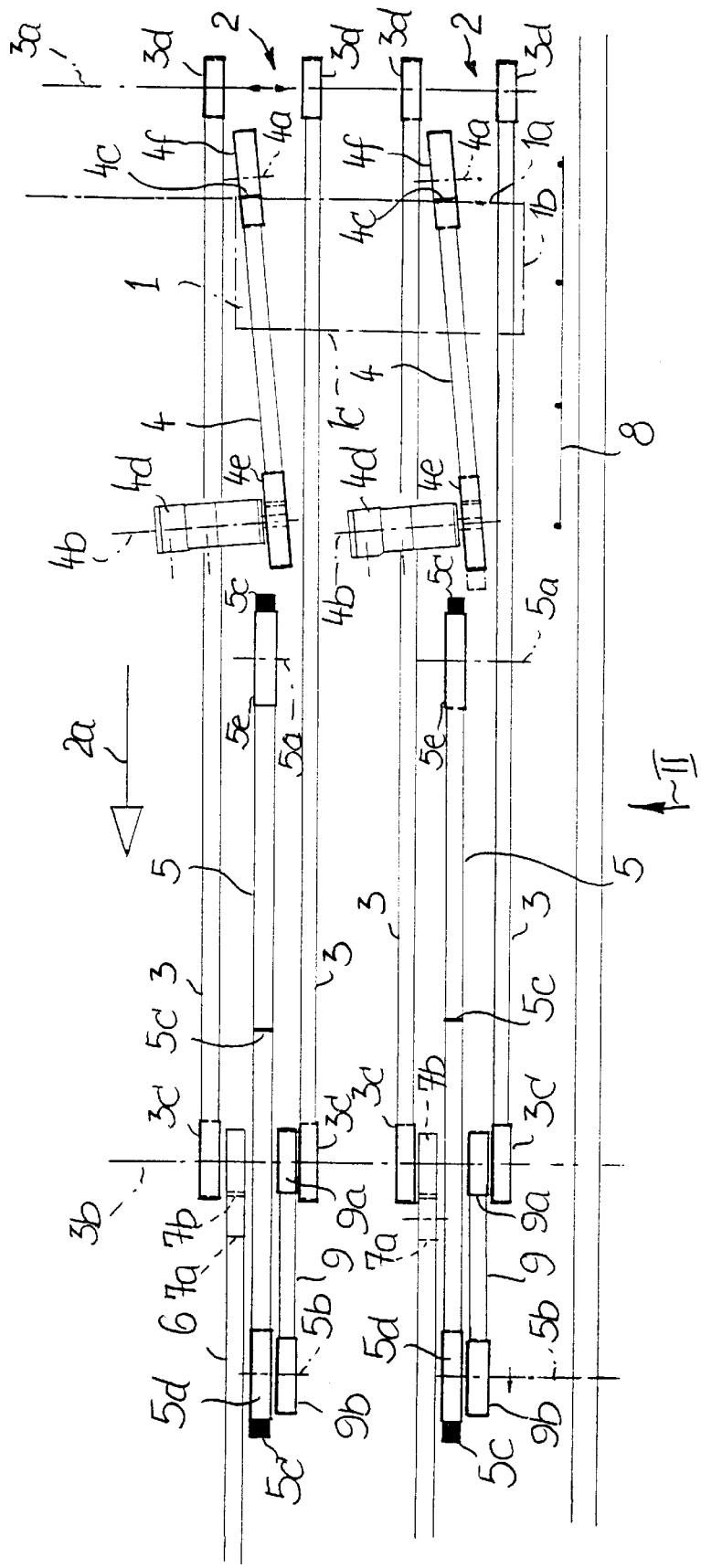
FIG. 1 is a top view of the device that is represented schematically.
Figure 2:
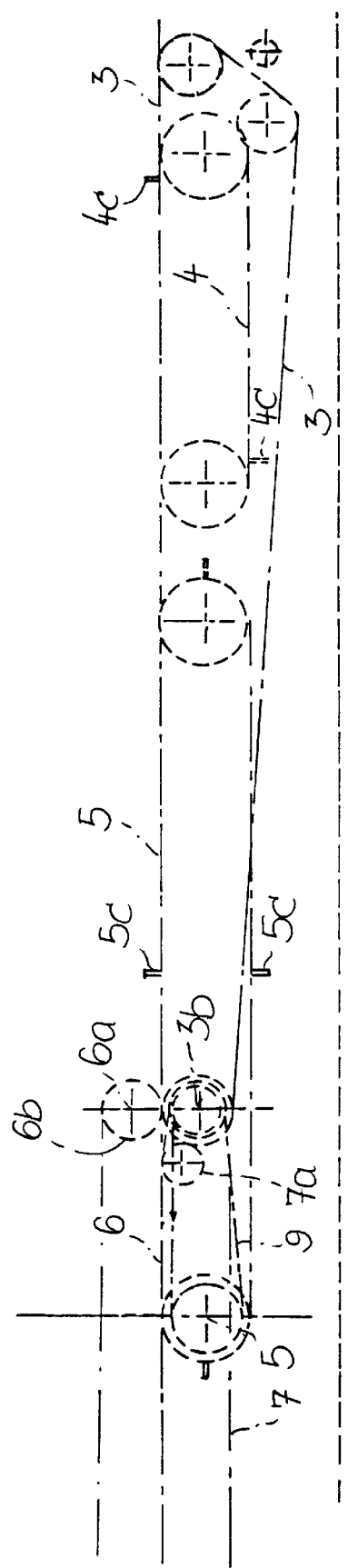
FIG. 2 is a schematic representation of a side view of the device according to FIG. 1, seen from the direction of the arrow II.

Tube segments 1 are picked up by a rotating feeder, not shown, arranged to the right according to FIGS. 1 and 2, and laid individually upon the illustrated device for alignment. The device exhibits two mutually parallel, identically constructed transport units 2, which transport the tube segments 1 in the direction of travel indicated by an arrow 2a. The mounting of that transport unit which is the lower one according to FIG. 1 is stationary. That transport unit which is the upper one according to FIG. 1 is installed in such a way that it can be shifted crosswise relative to the direction of travel 2a. This crosswise adjustment permits the use of the device for tube segments having different formats.

Each transport unit 2 exhibits two first conveyor belts 3, arranged at a distance from one another. Two second conveyor belts 4 respectively extend between the first conveyor belts 2 in the area to the right according to FIG. 1. Third conveyor belts 5 are respectively arranged between the first conveyor belts 3 in the following middle zone. The third conveyor belts 5 run parallel to the first conveyor belts 3 and in the direction of travel 2a. The second conveyor belts 4 extend, seen in the projection onto the plane of travel, at an acute angle relative to the direction of travel.

The back zones of the third conveyor belts 5, as seen in the direction of travel, run next to a fourth conveyor belt 7 (see FIG. 2). The fourth conveyor belt 7 acts together with a counteracting conveyor belt 6 positioned above it, which runs in the opposite direction. Because the conveyor belts 7 and the counteracting conveyor belts 6 run at the same transport speed, the upper surface of conveyor belt 7 and the lower surface of the counteracting conveyor belt 6 move synchronously, with the result that the aligned tube segments 1 positioned between them do not change their alignment over the entire transport distance thus formed. The aligned tube segments 1 are carried by the conveyor belts 7 and the counteracting conveyor belts 6 into the production plant, not shown, to the left in FIG. 1.

The transport plane, in which the tube segments 3 are transported, is formed by the upper surfaces of the first conveyor belts 3, of the second conveyor belts 4 and of the third conveyor belts 5, all of which run at the same level. The second conveyor belts 4 possess several entrainment means 4c, distributed at equal intervals over the entire length. The third conveyor belts 5 possess entrainment means 5c distributed uniformly along their length.

The second conveyor belts 4 are produced as cog belts. Each of the two conveyor belts 4 is driven by a drive motor 4d that can be regulated. The shaft 4b of the drive unit consisting of the drive motor 4d and drive wheel 4e and, optionally, a reduction drive is arranged at an angle deviating by 90° from the direction of travel. The same is true for the shafts 4a of the guide wheels 4f. The drive wheels 4e and the guide wheels 4f are gears that mate with the teeth of conveyor belt 4. Attached to the outer side of the conveyor belts 4 are the entrainment means 4c, which carry the tube segments 1, both in the direction of travel as well as crosswise to the same, towards a sensor 8, which is configured as a light barrier.

The first conveyor belts 3, the third conveyor belts 5 and the fourth conveyor belts 7 are driven by a common motor, not shown, which rotates a common shaft, not shown, on a common center 3b. Drive wheels 3c, 7b and 9a are fixed to the shaft and turn with it.

The driving of the first conveyor belts 3, which are configured as a flat belt, takes place via the drive wheels 3c. The first conveyor belts 3 pass over guide wheels 3d, rotating on an axis 3a.

Drive wheel 9a is configured as a drive gear and drives a belt drive 9, whose tube drive gear 9b is fixed together with the drive gear 5d to a shaft revolving on the axis 5b. Drive gear 5d drives the third conveyor belt 5, configured as a cog belt, which passes over a guide gear 5e revolving on a center 5a. The third conveyor belt 5 carries stops 5c arranged at regular intervals on its outer side. As a result of a corresponding choice of the diameter of the drive wheel 3c and the pitch-circle diameter of the drive gears 9a and 5d and the drive wheel 9b, the speed of the first conveyor belts 3 is in a fixed, predetermined ratio to the speed of the third conveyor belts 5.

The drive wheel 7b of the fourth conveyor belt 7 is fixed to and turns with that shaft, not shown, also carrying drive wheels 3c and 9a, which revolves on the axis 3b. In order that the fourth conveyor belt 7 can run more slowly than the first conveyor belt 3, the drive wheel 7b exhibits a smaller diameter than the drive wheel 3c of the first conveyor belt 3. Because the upper surface of conveyor belt 3 and the upper surface of conveyor belt 7 must lie in the same plane, the fourth conveyor belt 7 is lifted up to the plane of travel by a support wheel 7a.

The axis of rotation 6a of a guide wheel 6b is aligned in the vertical plane with the axis 3b of drive wheel 7b.

The upper surface of the fourth conveyor belt 7 and the lower surface of the counteracting conveyor belt 6 lie against one another.

Arranged in the zone of the second conveyor belts 4, next to the lower conveyor belt 4 according to FIG. 1, is the sensor 8, configured in the form of a light barrier, which responds when the front edge 1b reaches the position of the sensor.

The wide side 1a of a tube segment 1 deposited on the first conveyor belts 3 is gripped at the back, as seen in the direction of travel, by the entrainment means 4c. Because the second conveyor belts 4 are running at a faster speed than the first conveyor belts 3, the entrainment means 4c push the tube segment 1 relative to the first conveyor belts 3, both in the direction of travel and also in the direction perpendicular to it. The crosswise shift results from the inclined arrangement of the second conveyor belts 4 relative to the direction of travel 2a.

As soon as the sensor 8 detects the front edge 1b of the tube segment 1, the speed rate of the drive motor 4d is adjusted to a revolution rate at which the speed of the second conveyor belt 4 will lie below that of the first conveyor belt 3. Because the second conveyor belt 4 will lag the first conveyor belt 3 after the adjustment of the revolution rate of the drive motor 4d, the back of the wide side 1a of tube segment 1 will draw away from the entrainment means 4c, and transport in the aligned position will now take place exclusively in the direction of travel 2a via the first conveyor belts 3. The drive motor 4d is accelerated to a speed higher than the normal transport speed after a preset time, in which the back of the wide side 1a of the tube segment 1 has been moved sufficiently far from the entrainment means 4c. The entrainment means are moved forwardly at this increased speed, so that they assume the position that they would have reached at continuously constant transport speeds. As soon as this situation is reached, the drive motor 4d and the second conveyor belts 4 run again at the normal speed of travel.

The relationships must be chosen in such a way that, with the described lagging of the entrainment means 4c with increased speed, these entrainment means will not again be able to reach the back wide side 1a of the tube segment 1.

During the transport of the tube segment 1 via the first tube segment 3 in the aligned position, the tube segment 1 is moved up to stops 5c, which are provided on the third conveyor belt 5. Because the third conveyor belts 5 run more slowly than the first conveyor belts 3, the tube segment 1 is held, lying at the stops, until it is stretched for further transport between the fourth conveyor belts 7 and the counteracting conveyor belts 6. The fourth conveyor belts 7 and the counteracting conveyor belts 6 run at a slower speed than the third conveyor belts 5, so that the stop 5c is removed from the front edge 1a of the tube segment 1 during the transfer of the tube segment 1 between the fourth conveyor belt 7 and the counteracting conveyor belt 6.

By providing the third conveyor belts 5, and its design, it is assured that tube segments 1, following one after the other, will always maintain a constant distance from one another. Those conveyor belts 4 and 5 exhibiting stops or entrainment means are configured as cog belts in order to prevent slippage between these conveyor belts and their drive wheels 4e or 5d. Such slippage would have to result in a false alignment of the tube segments.

What is claimed is:

1. Device for the alignment of tube segments (1), especially with several stagger-cut layers of paper at the ends (1b), exhibiting mutually parallel first conveyor belts (3) on which the tube segments lie with their wide sides (1a) facing the direction of travel, as well as second conveyor belts (4) carrying stops arranged at preset intervals, in which case the second conveyor belts are aligned at an angle relative to the direction of travel, wherein the first conveyor belts (3) are aligned in the direction of travel and the second conveyor belts (4) are aligned at an angle relative to the direction of travel and the stops on the second conveyor belts (4) are entrainment means designed to engage the back wide side (1a) of the tube segments (1), their purpose being to push an end (1b) of the tube segment (1) on the first conveyor belt (3) to a sensor (8) that operates without making contact in such a way that a signal from the sensor (8) triggered by the end (1b) will retard the second conveyor belts (4), which are leading the first conveyor belts (3), in such a way that further transport will be taken over exclusively by the first conveyor belts (3).

2. Device for the alignment of tube segments according to claim 1, wherein behind the second conveyor belts (4), in the direction of travel, third conveyor belts (5) run in the direction of travel, which carry stops (5c) for the front wide side (1a) of the tube segments (1) and which lag the first conveyor belts (3).

3. Device for the alignment of tube segments according to claim 2, wherein fourth conveyor belts (7) are arranged behind the first and third conveyor belts (3; 5) in the direction of travel, counteracting conveyor belts (6) being arranged above them, that run synchronously with them and thus cooperate with them, both sets of belts being designed for the force-locking transport of those tube segments (1) lying between them.

4. Device for the alignment of tube segments according to claim 2, wherein the transport speed of the second conveyor belts (4) is higher than that of the third conveyor belts (5).

5. Device for the alignment of tube segments according to claim 3, wherein the transport speed of the third conveyor belts (5) is higher than that of the fourth conveyor belt (7).

6. Device for the alignment of tube segments according to claim 2, wherein at least one of the first conveyor belts (3) forms a conveyor unit (2) together with the second and third conveyor belts (4; 5), and that the device exhibits several conveyor units (2), among which at least one can be adjusted in a direction crosswise relative to the direction of travel.

7. Device for the alignment of tube segments according to claim 2, wherein at least one conveyor belt (4; 5) is configured as a cog belt.

8. Device for the alignment of tube segments according to claim 1, wherein the second conveyor belts (4) are powered by drive motors (4d) whose revolution rate can be regulated.

9. Device for the alignment of tube segments according to claim 1, wherein the sensor which operates without making contact is configured as a light barrier.

10. Device for the alignment of tube segments according to claim 3, wherein the first, third and fourth conveyor belts (3; 4; 5) of each conveyor unit (2) are arranged side by side.

11. Device for the alignment of tube segments according to claim 2, wherein the upper surface of the first conveyor belt (3) extends along the complete length of the upper surface of the second conveyor belt (4) and largely along the upper surface of the third conveyor belt (5) in the direction of travel.

12. Device for the alignment of tube segments according to claim 3, wherein the speeds of the second, third and fourth conveyor belts (4; 5; 7) are in a fixed ratio relative to one another, which depends upon the maximum width of the tube segments (1).

13. Device for the alignment of tube segments according to claim 3, wherein the first, third and fourth conveyor belts (3; 5; 7) of each conveyor unit are powered by a common drive motor.

14. Device for the alignment of tube segments according to claim 3, wherein the fourth conveyor belts are arranged behind the first and third conveyor belts in the direction of travel, counteracting conveyor belts being arranged above them, that run synchronously with them and thus cooperate with them, both sets of belts being designed for the force-locking transport of those segments lying between them.

15. Device for the alignment of tube segments according to claim 2, wherein the transport speed of the second conveyor belts is higher than that of the third conveyor belts.

16. Device for the alignment of tube segments according to claim 3, wherein the transport speed of the second conveyor belts is higher than that of the third conveyor belts.

17. Device for the alignment of tube segments according to claim 1, wherein there are several stagger-cut layers of paper at the ends of the tube segments.

18. Device for the alignment of tube segments according to claim 3, wherein the transport speed of the third conveyor belts is higher than that of the fourth conveyor belt.

19. Device for the alignment of tube segments according to claim 4, wherein the transport speed of the third conveyor belts is higher than that of the fourth conveyor belt.

20. Device for the alignment of tube segments according to claim 2, wherein at least one of the first conveyor belts forms a conveyor unit together with the second and third conveyor belts, and the device exhibits several conveyor units, among which at least one can be adjusted in a direction crosswise relative to the direction of travel.

* * * * *